March 23, 1965  W. G. WADEY  3,174,509
FLUID POSITION SENSOR

Filed April 11, 1962  3 Sheets-Sheet 1

INVENTOR.
WALTER G. WADEY

BY *Griffin and Stokes*
ATTORNEYS

March 23, 1965 W. G. WADEY 3,174,509
FLUID POSITION SENSOR
Filed April 11, 1962 3 Sheets-Sheet 3

United States Patent Office 3,174,509
Patented Mar. 23, 1965

3,174,509
FLUID POSITION SENSOR
Walter G. Wadey, Wynnewood, Pa., assignor to Sperry Rand Corporation, New York, N.Y., a corporation of Delaware
Filed Apr. 11, 1962, Ser. No. 186,684
18 Claims. (Cl. 137—625.11)

The present invention relates to means for directly achieving digital position measurements of machine elements, and more particularly, to means employing a fluid medium.

The use of digital techniques for process control has been increasingly relied upon to provide the high precision and flexibility inherent in the digital data processing art. In particular, the rapid advances in the accurate controlling of machine tools has been directly due to the application of these techniques. For example, the automatic operation of a lathe can be performed by providing a stored program data processing device which operates upon data in digital form and which controls the position of the cutting tool for each particular instant of the process. However, this requires that the processing device know exactly where the cutting tool and its carriage is in any particular instant of time. Therefore, in order to take advantage of said digital techniques, there must be an establishment of a suitable link between the computer and the rest of the system.

In the early art of machine tool control, the end result of whatever physical quantity was being measured was a shaft position or a voltage signal as an input to an analog system. These commercially available instruments are called shaft digitizers and voltage-to-digital converters. However, in keeping with the use of digital data processing equipment for machine control, a more fundamental approach has been to obtain a digital indication of machine element position directly at the point of measurement. Such prior art may employ photoelectric, magnetic, electrical or electrostatic phenomenon in both sensing and producing a recognizable signal. However, the present invention, while providing direct digital position measurement, does so by fluid means. A plurality of fluid output channels are provided in only one of which appears a significant value of fluid pressure for each unique incremental position of the machine element to be measured. By representing the output signal in a fluid medium, the present invention may be simply manufactured of highly reliable and virtually indestructible elements. Furthermore, one other highly advantageous feature found in the present invention is that it is particularly adapted for use in the rapidly expanding field of pure fluid systems. The pure fluid art has been hastened by the advent of the pure fluid amplifier which, in essence, permits a low energy fluid control jet stream to determine the usable output energy of relatively high energy fluid power jet stream. The fluid outputs of the present position indicator are therefore ideal for use as control streams in a fluid system embodying such pure fluid amplifiers.

It is therefore one object of the present invention to provide fluid position sensing mechanism which is highly reliable.

Another object of the invention is to provide a fluid device which will sense the relative position of two parts which move with respect to each other linearly.

Still another object of the present invention is to provide a fluid device which will sense the relative position of two parts which move in respect to each other angularly.

These and other objects of the present invention will become apparent during the course of the following description, which is to be read in conjunction with the drawings, in which:

FIGURES 1, 2, and 3 show various views of one embodiment of the invention for sensing linear position;

Figure 1:
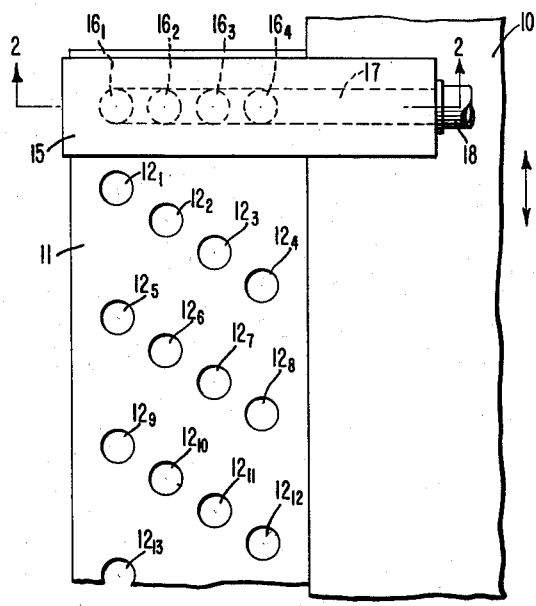
Figure 2:
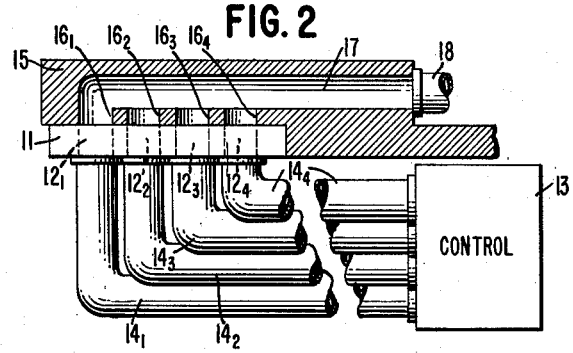
Figure 3:
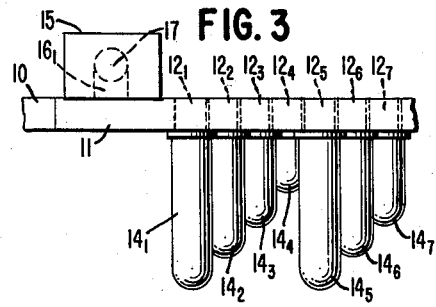

Reference is now made to FIGURES 1, 2, and 3. The first embodiment of the invention is used for sensing the linear position of one element with respect to another. For example, the movable cutting tool carriage 10 of an engine lathe may be located in relation to the bed 11 of the lathe by means of the following novel configuration of fluid ports and channels. The portion 11 of the lathe bed, as shown in FIGURE 1, contains arranged holes or ports 12 each of which communicates to a respective element such as a fluid amplifier in a control box 13 by means of an associated fluid channel 14. Said ports 12 are disposed in parallel, diagonal rows along the longitudinal dimension of bed plate 11. For example, holes $12_1$ through $12_4$ are in a first diagonal row, with holes $12_5$ through $12_8$ being in the second diagonal row, and so on.

The moving carriage 10 contains a bar 15 extending from its surface and over the surface of bed plate 11 with only a sliding clearance therebetween. Drilled into the underside of bar 15 (which is that side sliding adjacent the top surface of plate 11) are a number of ports 16 equal to the number of ports 12 in each of the diagonal rows. Ports 16 in said bar may be spaced equidistantly from each other along a straight line corresponding to the longitudinal axis of said bar, so that each port 16 lines up with the ports 12 in one of the longitudinal columns of ports on plate 11. For example, port $16_1$ successively passes over ports $12_1$, $12_5$, $12_9$, $12_{13}$, etc. as the carriage 10 moves with respect to plate 11. In like fashion, port $16_2$ successively sweeps over ports $12_2$, $12_6$, $12_{10}$, etc. with ports $16_3$ and $16_4$ respectively sweeping over the longitudinal rows of ports $12_3$, $12_7$, $12_{11}$ and $12_4$, $12_8$, $12_{12}$, respectively. Each port 16 is connected to a common fluid channel 17 which in turn is connected to a source of fluid under pressure via a conduit 18.

Figure 4:
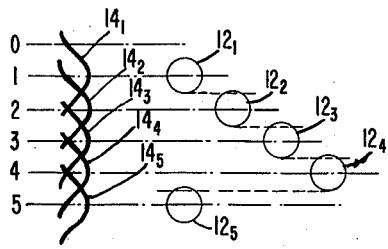
FIGURE 4 is a diagram illustrating the output pressure waveforms during operation of the device in FIGURES 1–3.

Referring now to FIGURE 4, there is shown the preferred spacing of ports 12 one from the other on plate 11. Only five ports 12 are shown in FIGURE 4, but it will be understood that the same relationship holds in the other diagonal rows on plate 11. The ports in each diagonal row are spaced one from the other in the direction of motion of bar 15 such that their respective diameters overlap to a slight degree as indicated by the dotted lines. Furthermore, each end port of a diagonal row is spaced the same distance from the closest end port of the next adjacent diagonal row as it is from the adjacent port in its own diagonal row. This is clearly shown in FIGURE 4 by the dotted lines connecting port $12_4$ (the end port of the first diagonal row) with port $12_5$, the closest end port of the next diagonal row.

In operation, fluid under pressure is constantly applied to input channel 17 communicating with all four ports 16 in bar 15. This fluid is preferably air, but may be another gas or liquid. If the fluid employed in the system differs from that of the external environment surrounding carriage 10 and plate 11, then some sort of fluid seal may be effected between the contacting surfaces of block 15 and plate 11 in order to prevent leakage of said fluid. Suitable fluid seals in this case may be those disclosed in pending applications Serials Nos. 131,912 and 131,913, now Patent numbers 3,122,166 and 3,122,167, respectively. In a typical operation, the lathe head screw (not shown) moves the tool carriage 10 along the bed such that bar 15 has its longitudinal axis always parallel with the rectangular transverse axis of plate 11. Consequently, fluid will be communicated to ports 12 in plate 11 in succession. As a port 16 commences to sweep across a port 12, the pressure in the corresponding output line 14 begins to increase from its lowest level until port 16 is directly over said port 12 when it is said to be in complete alignment therewith. As bar 15 continues to move in the same direction, the port 16 sweeps past the center position and so reduces the output pressure detected in the associated output line. This pressure waveform is shown in FIGURE 4 where, for example, $14_1$ illustrates the pressure in output channel $14_1$ for different positions of port $16_1$ relative to port $12_1$. If the center of port $16_1$ is at the position of dot-dash line 0 in FIGURE 4, then only a small portion of port $12_1$ is aligned thus resulting in a small rise in pressure in output channel $14_1$. As bar 15 moves downward in FIGURE 1, more of port $12_1$ is aligned thereby increasing the pressure in output channel $14_1$. Eventually, the center of port $16_1$ is at the position of dot-dash line 1 which thereby places it directly over port $12_1$ to produce the maximum pressure output in channel $14_1$. Thereafter, if bar 15 moves to either side of this center or completely aligned position, then the pressure in output channel $14_1$ decreases according to the FIGURE 4 illustration. The same kind of pressure change will be noted in each of the other output channels 14 as the associated port 16 passes over their ports 12.

As best illustrated in FIGURE 4, fluid is communicated from bar 15 to the ports 12 in plate 11 in overlap succession due to the overlap of the port 12 diameters. FIGURE 4 shows that the pressure in an output channel begins to rise from its lowest level prior to the attainment of maximum pressure in the preceding channel. For example, the pressure in output channel $14_2$ begins to rise as soon as port $16_2$ starts to overlap port $12_2$. At this particular instant during the position of bar 15, port $16_1$ has not yet been centered upon the dot-dash line 1 so that maximum pressure in output channel $14_1$ is not yet present. Consequently, when port $16_1$ is completely aligned with port $12_1$, the pressure in output channel $14_1$ is maximum and the pressure in output channel $12_2$ has been increased somewhat from its lowest value. The same overlap pressure sequence is seen in the succeeding channels $14_3$ and $14_4$ all on the same diagonal row. Furthermore, since ports $12_4$ and $12_5$ overlap in the direction of bar 15 motion, there is a corresponding overlap of pressure rise in output channels $14_4$ and $14_5$. The pressure change in output channels $14_6$, $14_7$, etc. waxes and wanes in the manner identical to that shown for the ports in the first diagonal row.

Alternatively, the ports 12 in the same diagonal row may be displaced to a lesser degree than that shown in FIGURE 4 so that more overlap between them occurs. In this case, the peaks of pressure values in the adjacent output channels will be closed together so that a finer incremental division of the linear position of carriage 10 results. There is practically no limitation on the amount of overlap possible between adjacent ports 12, except that it cannot be 100 percent. This is so, since there must at all times times be a one-to-one correspondence between the maximum pressures in the output lines and the position of carriage 10 to bed plate 11. The transmittal of these pressures to fluid amplifiers, for example, can control the motion and positioning of carriage 10 by means of suitable servo-mechanism devices. In summary, then, FIGURE 4 illustrates that the overlap arrangement causes some alignment to occur at any position for at least two of the ports 12 with their respective ports 16.

For port arrangements such as shown in FIGURE 4 fluid amplifiers or analogous active devices (which operate above a certain threshold pressure) may be employed to indicate precisely the position of the moving machine element. For example, in the case of FIGURE 4, each active element associated with an output channel 14 may be one to give a positive indication when the output pressure rises above a certain first threshold value (which occurs before maximum pressure is created). Thereafter, the active element maintains its positive indication until the pressure in the associated channel is reduced below a second threshold value, which may be equal to or even below said first threshold value. In this way, the active element connected to the output channel next to be energized is set to a positive indication at least by the time the preceding active element returns to its non-indicating condition. Of course, as the percentage of overlap increases so that the maximum pressure peaks become closer in time as bar 15 moves, said first and second threshold pressure values for each active output element can increase toward the maximum pressure in the line. Thus, the above described novel principal of the invention can be used to design a family of flexible linear position indicating devices which are limited only by the imagination of the designer.

Figure 5:
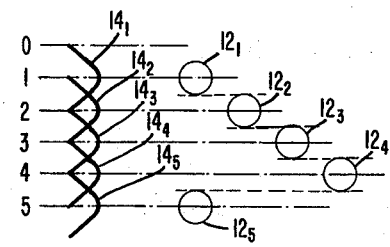
FIGURE 5 is a diagram illustrating the output pressure waveforms for a slightly different spacing of the ports in the embodiment of FIGURES 1–3.

FIGURE 5 illustrates output pressure waveforms for a slight increase in the port 12 displacement. Assume that in FIGURE 1 the ports 12 in the same diagonal row are now displaced along the direction of motion so that the diameters of adjacent ports are end to end. In FIGURE 5, this is shown by the dotted lines which indicate that ports 12 are displaced in such a manner that if all were put in the same longitudinal column, their circumferences would abut one another. Thus, when port $16_1$ completely aligns with port $12_1$, port $16_2$ is just commencing to align with port $12_2$. The waveforms to the left indicate, therefore, that maximum pressure in channel $14_1$ occurs just prior to the time that pressure in channel $14_2$ begins to increase. The arrangement in FIGURE 5, therefore, differs from that of FIGURE 4 since when one of the ports 12 is completely aligned with its corresponding port 16, there is no partial alignment of any other port 16. However, for any alignment of a port 16 which is less than 100 percent there is at least a partial alignment of at least one other port 16. Consequently, it is still possible to examine the output pressures and determine the position of bar 15 without ambiguity, so as to come within the novel principles of the present invention.

Figure 6:
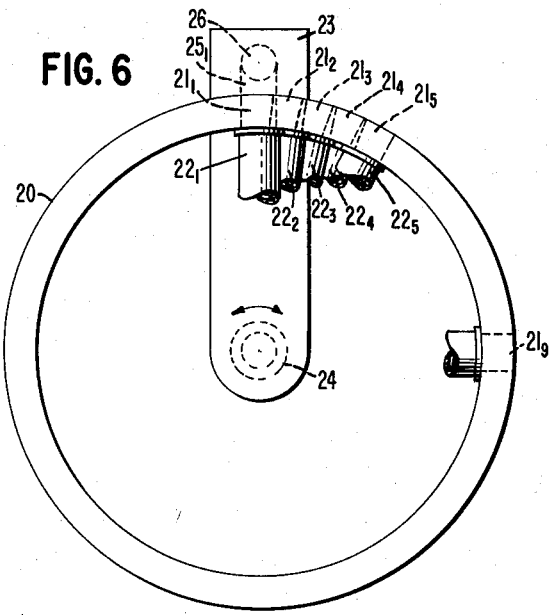
FIGURES 6 and 7 show various views of a second embodiment of the invention for sensing angular position of a machine element.
Figure 7:
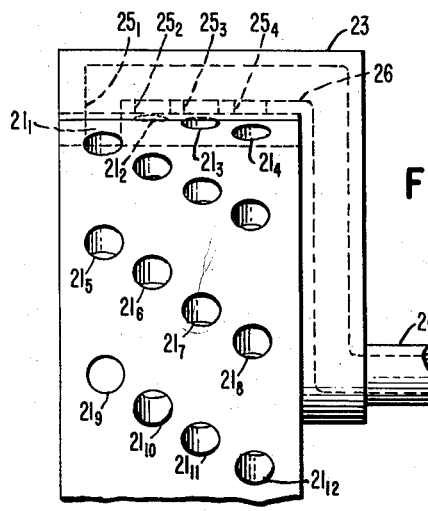

FIGURES 6 and 7 show an alternative embodiment of the invention which may be used for measuring or sensing the angular rotation of a shaft. For example, the device of FIGURES 6 and 7 may be employed on the head of an engine lathe in order to determine the absolute angular position of the workpiece. A stationary hollow cylinder 20 may be provided with a plurality of diagonal rows of ports 21 spaced about its periphery. Cylinder 20, if developed into a single plane, would look identical to plate 11 in FIGURE 1. FIGURE 6 shows the end view of cylinder 20, while FIGURE 7 shows the side view. Only a few of the ports 21 are indicated in FIGURE 6, together with output conduits 22, but it is to be understood that in most cases the diagonal rows of ports 21 are spaced about the entire circumference. Furthermore, conduits 22 may be fed to a control unit such as unit 13 in FIGURE 2 for energizing indicating elements responsive to certain values of pressure therein.

A bar 23 is rotated around the outer circumference of cylinder 20 by means of a shaft 24. Bar 23, as best shown in FIGURE 7, may be actually bent at a right angle in order to allow its horizontal leg to sweep over the cylinder circumference. Ports 25 are drilled in bar 23 and each communicates with a central bore 26 which is supplied with fluid via a source not shown but which can communicate through shaft 24. Each port 25 sweeps a particular longitudinal column of ports 21 in the same manner that ports 16 sweep the columns of port 12. Except for the fact that bar 23 moves in a curved plane over the curved surface of cylinder 20, the operation of the device in FIGURES 6 and 7 is exactly as illustrated in FIGURES 4 and 5.

Advantage can also be taken of the longitudinal parallel spacing between the ports 21. This longitudinal spacing is that between the parallel columns of the ports, e.g., between the column of ports $21_1$, $21_5$, and $21_9$, etc. and the column of ports $21_2$, $21_6$, $21_{10}$, etc. By moving cylinder 20 axially with respect to the rotating bar 23, a compound motion describing a helix is thereby generated. Thus, by fixing shaft 24 and cylinder 20 to the appropriate machine tool, a very precise screw thread can thus be accomplished.

Figure 8:
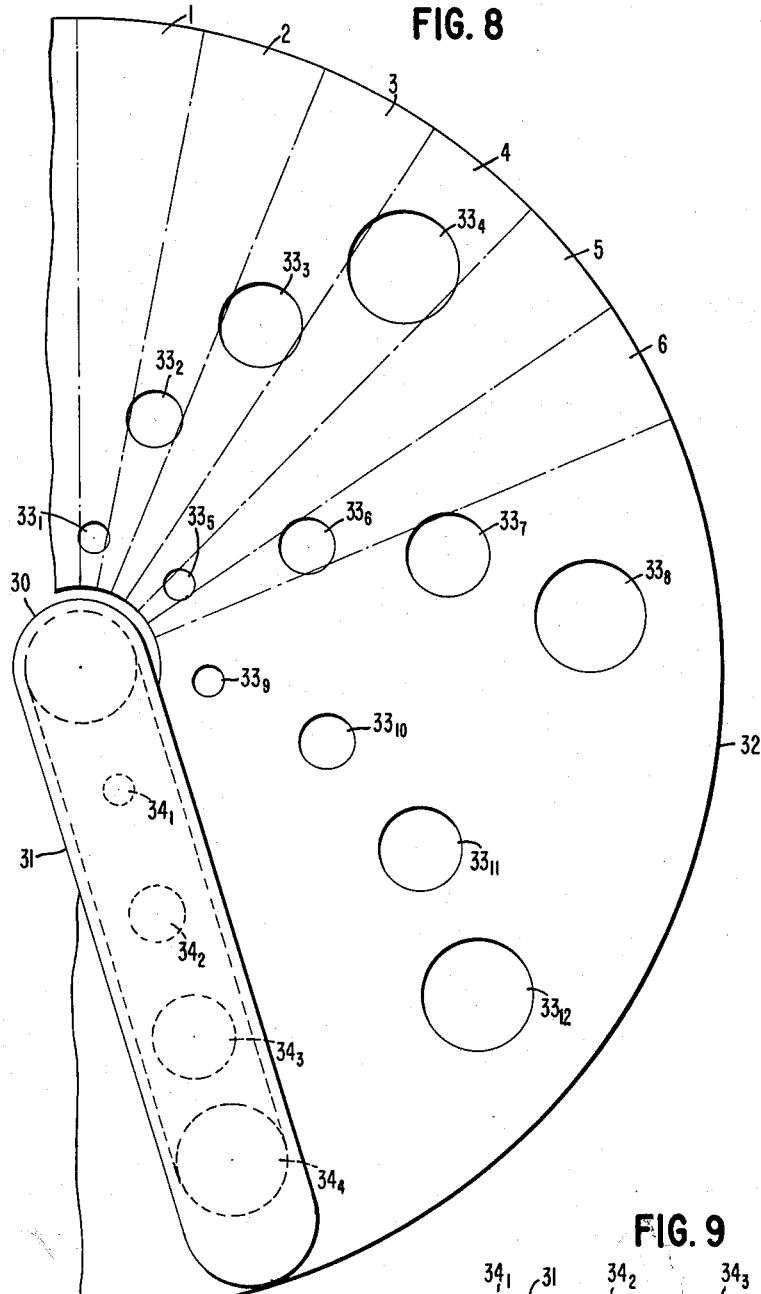
FIGURES 8 and 9 show various views of a third embodiment of the invention also used for sensing angular position of a machine element.
Figure 9:
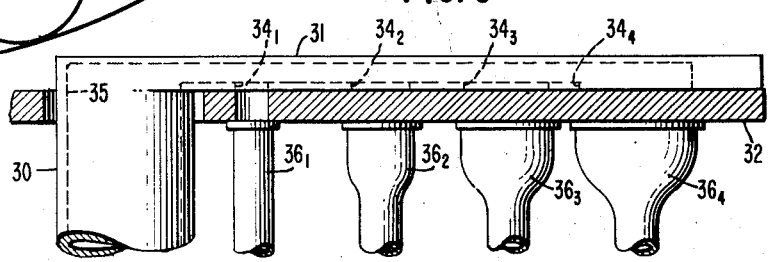

FIGURES 8 and 9 show a third embodiment of the invention which is analogous to that shown in FIGURES 6 and 7 since it is employed to measure the angular rotation of a shaft. As best shown in FIGURE 9, a shaft 30 terminates in a bar 31 bent at right angles thereto. Bar 31 sweeps over the face of a circular disc or plate 32 which has a pattern of ports 33 therein as best shown in FIGURE 8. Ports 33 in plate 32 are arranged in a pattern of radial rows starting from the center axis of shaft 30. For example, ports $33_1$, $33_2$, $33_3$ and $33_4$ are in the same radial row, with ports $33_5$ through $33_8$ in a different radial row. However, each port 33 of the same radial row lies in a different radial segment, such as segments 1, 2, 3, etc. These segments preferably are of equal angle so as to afford linearity in the output indication. Consequently, these radial rows are actually curved so as to produce an angular overlapping of holes similar to the overlapping described in connection with the first two embodiments of the invention. However, one difference here is that the size of the ports in the same radial row increases according to their distance from the center of plate 32. In similar fashion, a plurality of ports 34 drilled on the underside of bar 31 also increase in size according to the radius from the shaft 30. The ports 34 communicate with a common fluid channel 35 internal of bar 31 and shaft 30.

As shown in FIGURE 8, the end ports $33_1$, $33_5$, $33_9$, etc. of the radial rows all lie at the same radius from shaft 30 such that port $34_1$ registers with each in succession as bar 31 rotates. In similar fashion, end ports $33_4$, $33_8$, $33_{12}$, etc., all lie the same distance from shaft 30 so that port $34_4$ in bar 31 will sweep each in succession. Ports $33_2$, $33_6$, $33_{10}$, etc. and ports $33_3$, $33_7$, $33_{11}$, etc. are further swept by ports $34_2$ and $34_3$, respectively, as bar 31 rotates. Preferably, the distances between each circumferential ring of ports is the same, just as the distances between the parallel longitudinal columns of ports 12 in FIGURE 1 are the same.

As mentioned above, it is desirable that equal angular displacements of shaft 30 will provide maximum pressure outputs in the output channels 36 associated with adjacent ports of the same radial row. In other words, just as FIGURE 4 shows equal spacing between peaks of pressure in adjacent output lines, the configuration and size of ports 33 in FIGURE 8 should also produce equal distances between the maximum pressure peaks in adjacent output lines 36. Overlap of pressure signals should also be provided either in the manner of FIGURE 4 or of FIGURE 5. To accomplish these two functions, ports 33 of the same radial row increase in diameter according to their distance from shaft 30, as well as being placed in different radial but adjacent segments. For example, port $33_1$ may be located in the radial segment 1, while port $33_2$ is located in radial segment 2. Radial segments 1 and 2 are of equal arc angle. However, since port $33_2$ is further from shaft 30 than is port $33_1$, its diameter is larger and, in order to provide the same amount of overlap as shown in FIGURE 4, should extend slightly into segment 1 and into the next adjacent segment 3. Port $33_1$ should likewise extend into its next two adjacent segments. Port $33_3$ is found in segment 3 (of arc width equal to segments 1 and 2) and its diameter is such as to allow it to extend slightly into adjacent segments 2 and 4. The end port $33_4$ of the first radial row is found in segment 4 and is of even larger diameter so as to overlap slightly segments 3 and 5. In the particular embodiment shown in FIGURE 8, port $33_5$, found in segment 5, is on the inner circumferential ring of ports and so is reduced in diameter equal to that of port $33_1$. The diameter of port $33_5$ also overlaps slightly segments 4 and 6.

The cooperation between ports 33 and ports 34 may best be understood by a description of the operation. Assume that bar 31 is rotated so that port $34_1$ completely covers port $33_1$ in order that fluid may be communicated to the corresponding output conduit $36_1$. For this position the maximum pressure is detected in the output line which is used by the control unit to indicate a unique position of bar 31 with respect to plate 32. While in this position, port $34_2$ also overlaps to a slight degree port $33_2$ in order to communicate a small amount of fluid to the output channel $36_2$. As bar 31 rotates clockwise, more of port $33_2$ will be aligned to port $34_2$, with a corresponding decrease in alignment of port $33_1$ with part $34_1$. At the time that port $34_2$ is completely aligned with port $33_2$, maximum pressure is detected in output channel $36_2$. At this instant of rotation, only a partial alignment exists between ports $34_1$ and $33_1$, and between ports $34_3$ and $33_3$. Therefore, only a small increase in pressure from the minimum is detected in output channels $36_1$ and $36_3$. As bar 31 continues to rotate clockwise, port $33_3$ becomes completely aligned in order to generate maximum pressure in its output channel. Upon bar 31 rotating so that port $34_4$ is directly over port $33_4$, maximum pressure occurs in output channel $36_4$, with slight increases in pressure being detected in output channels $36_3$ and $36_5$. Consequently, it will be seen that the configuration and sizes of the ports 33 in FIGURE 8 result in the same kind of outputs as were noted in the previous two embodiments.

Since the diameter of ports 33 and ports 34 depend upon their distance from shaft 30, it may be that the maximum pressures obtained in the output channels will not be the same value due to the differing cross-sectional areas of the fluid passageways. Although this does not affect the location of the miximum peaks in angular position, since it is a difference only in degree and not in kind, it may be desirable that the pressures applied to the control unit be uniform in amplitude. This feature can be effected in a variety of ways, one of which is shown in FIGURE 9 which shows that the larger output channels 36 may be reduced in diameter to equal that of channel $36_1$. Since input channel 35 is fed from the same source of constant pressure, the maximum pressures in the output conduits 36 are equal at the points of equal diameter. Another way to accomplish the same function is by supplying each port 34 from a different source of fluid at a different pressure, such that the pressures in output channels 36 of different diameters will be equal. On the other hand, the indicating elements in the control circuitry may themselves be adjusted to respond to different ranges of input pressures in order to produce output signals of the same amplitude. Other ways of accounting for the different diameters of ports 33 and 34 may also be employed.

Although all of the embodiments in FIGURES 1 through 9 have shown a fluid supply bar moving with respect to the stationary receiving plate, other embodiments may be devised having the opposite mode of operation, e.g., plate 11 in FIGURE 1 may move instead of bar 15. Furthermore, the rows of ports 12 could be disposed at right angles to the direction of travel with ports 16 being diagonal to said direction. Alternatively, both ports 16 and ports 12 could be in diagonal rows at different angles with respect to motion. In FIGURE 8, for example, ports 34 might be in a curved row with ports 33 being arranged in straight radial rows.

Another modification possible for any of the embodiments is to introduce fluid under pressure into the output channels at a point between their ports and the control circuitry, with a plate having a row of ports (opening to the environment or the like) being passed across said output channel ports to uncover them one at a time. In this way, the pressure is an output channel would vary from a maximum value when its port is completely blocked by the moving plate, to a minimum value when its port is completely uncovered by a port in the plate. Or, there might be employed merely a slender bar the width of an output channel port which would successively block the ports as it passed over them, thus raising the pressure to a maximum value only at this time. Consequently, it is obvious that many modifications may be made to the preferred embodiments without departing from the spirit of the invention as defined in the appended claims.

I claim:

1. Fluid position sensing apparatus which comprises:
   (a) first means a surface of which contains a group of N first ports each communicating with fluid under a first pressure, where N is a whole number; and
   (b) second means a surface of which is adjacent to said first means surface and is relatively movable therewith, said second means surface containing M groups of N second ports each, where M is a whole number, each said second port communicating with a fluid output channel individual thereto containing fluid under a second pressure normally differing from said first pressure, each $n$th second port in each $m$th group being located to have maximal alignment in the direction of motion with the $n$th one of said first ports for some unique incremental position of said first means relative to said second means whereat no other second port is in maximal alignment with its respective first port, where said second ports are further arranged so that at least for any partial alignment of a second port with its respective first port, there is also a partial alignment of at least one other second port with its respective first port.

2. The apparatus according to claim 1 wherein said second means surface is flat.

3. The apparatus according to claim 1 wherein said second means surface is curved.

4. The apparatus according to claim 1 wherein said second means surface is cylindrical.

5. The apparatus according to claim 1 wherein said group of first ports are arranged in a row transverse at a first angle to the direction of motion between said first and second means, and said groups of second ports are arranged in a plurality of M parallel rows which are transverse at a second different angle to said direction of motion, there being N second ports in each $m$th row with the $n$th second port of each $m$th row being located for successive alignment with the $n$th first port.

6. The apparatus according to claim 1 wherein said second means surface is flat, with relative motion between it and said first means surface being about an axis of rotation normal to said second means surface.

7. The apparatus according to claim 6 wherein said group of first ports are arranged in a row extending radially from said axis of rotation, and said groups of second ports are arranged in a plurality of M rows extending radially from said axis of rotation, there being N second ports in each $m$th row with the $n$th second port in each $m$th row being located for successive alignment with the $n$th first port.

8. The apparatus according to claim 7 wherein the center of each said second port in the same row lies in a different radial segment, and the size of the $n$th first port and each $n$th second port is directly proportional to its radius from said axis of rotation.

9. The apparatus according to claim 8 wherein said radial segments are of equal size.

10. Fluid position sensing apparatus which comprises:
    (a) first means a surface of which contains a group of N first ports each communicating with fluid under a first pressure, where N is a whole number; and
    (b) second means a surface of which is adjacent to said first means surface and is relatively movable therewith, said second means surface containing M groups of N second ports each, where M is a whole number, each said second port communicating with a fluid output channel individual thereto containing fluid under a second pressure normally differing from said first pressure, each $n$th second port in each $m$th group being located to have maximal alignment in the direction of motion with the $n$th one of said first ports for some unique incremental position of said first means relative to said second means whereat no other second port is in maximal alignment with its respective first port, where said second ports are further arranged so that for the maximal alignment of any second port with its respective first port, there is also an alignment less than maximal of at least one other second port with its respective first port.

11. The apparatus according to claim 10 wherein said second means surface is flat.

12. Apparatus according to claim 10 wherein said second means surface is curved.

13. The apparatus according to claim 10 wherein said second means surface is cylindrical.

14. The apparatus according to claim 10 wherein said group of first ports are arranged in a row transverse at a first angle to the direction of motion between said first and groups of second means, and said second ports are arranged in a plurality of M parallel rows which are transverse at a second different angle to said direction of motion, there being N second ports in each $m$th row with the $n$th second port of each $m$th row being located for successive alignment with the $n$th first port.

15. The apparatus according to claim 10 wherein said second means surface is flat, with relative motion between it and said first means surface being about an axis of rotation normal to said second means surface.

16. The apparatus according to claim 15 wherein said group of first ports are arranged in a row extending radially from said axis of rotation, and said groups of second ports are arranged in a plurality of M rows extending radially from said axis of rotation, there being N second ports in each $m$th row with the $n$th second port in each $m$th row being located for successive alignment with the $n$th first port.

17. The apparatus according to claim 16 wherein each said second port in the same row lies in a different radial segment, and the size of the $n$th first port and each $n$th second port is directly proportional to its radius from said axis of rotation.

18. The apparatus according to claim 17 wherein said radial segments are of equal size.

References Cited in the file of this patent

UNITED STATES PATENTS

| 2,098,410 | Williams | Nov. 9, 1937 |
| 2,628,628 | Hertz | Feb. 17, 1953 |

FOREIGN PATENTS

| 1,115,556 | France | Jan. 9, 1956 |